June 9, 1964  E. LAUSTER  3,136,379
LIVE AXLE ASSEMBLIES FOR AUTOMOTIVE VEHICLES
Filed May 8, 1961  6 Sheets-Sheet 1

FIG. 1

INVENTOR.
Erhard Lauster
BY
Michael S. Striker
Attorney

June 9, 1964 E. LAUSTER 3,136,379
LIVE AXLE ASSEMBLIES FOR AUTOMOTIVE VEHICLES
Filed May 8, 1961 6 Sheets-Sheet 4

Fig. 4

INVENTOR:
ERHARD LAUSTER

BY

ATTORNEY

June 9, 1964  E. LAUSTER  3,136,379
LIVE AXLE ASSEMBLIES FOR AUTOMOTIVE VEHICLES
Filed May 8, 1961  6 Sheets-Sheet 5

Fig. 5

INVENTOR:
ERHARD LAUSTER

BY Michael S. Striker

ATTORNEY

June 9, 1964 E. LAUSTER 3,136,379
LIVE AXLE ASSEMBLIES FOR AUTOMOTIVE VEHICLES
Filed May 8, 1961 6 Sheets-Sheet 6

Fig. 6

INVENTOR:
ERHARD LAUSTER

BY

ATTORNEY

United States Patent Office 3,136,379
Patented June 9, 1964

3,136,379
LIVE AXLE ASSEMBLIES FOR AUTOMOTIVE VEHICLES
Erhard Lauster, 211 Neckartalstrasse,
Stuttgart-Bad Cannstatt, Germany
Filed May 8, 1961, Ser. No. 108,396
Claims priority, application Austria Jan. 29, 1960
15 Claims. (Cl. 180—62)

This application is a continuation-in-part of my application Serial No. 85,876.

The present invention relates to live axle assemblies for automotive vehicles, and more particularly to a live axle assembly whose traction may be varied so that the vehicle may advance on all types of terrain including very soft, very slippery and/or very hard ground.

It is already known to provide an automotive vehicle with an auxiliary traction means which becomes operative upon removal of the regular traction wheels and which receives rotary motion from a live axle of the vehicle. A serious drawback of such constructions is that the auxiliary traction means cannot be used simultaneously with the regular traction wheels and that the conversion from regular operation with traction wheels to an operation with auxiliary traction means requires too much time. In addition, the provision of a separate drive for the auxiliary traction means and the provision of separate supports for the auxiliary traction means increase the initial and maintenance cost of the vehicle.

Accordingly, it is an important object of the present invention to provide a live axle assembly which is constructed and assembled in such a way that the auxiliary traction means may be utilized simultaneouly and/or alternately with the regular traction wheels, wherein the regular traction wheels and the auxiliary traction means may be driven by a single source of power, and wherein the means for supporting the auxiliary traction means may be utilized to support the regular traction wheels.

Another object of the invention is to provide a live axle assembly of the just outlined characteristics which is constructed and assembled in such a way that the auxiliary traction means automatically engages with the ground whenever the traction of the regular wheels is insufficient to advance the vehicle on certain types of terrain.

A further object of the instant invention is to provide a live axle assembly of the above described type whose auxiliary traction means may be moved between its operative ground-engaging and idle positions while the vehicle is in motion and wherein the auxiliary traction means constitutes a component part of the arrangement which drives the regular traction wheels.

Still another object of the invention is to provide a live axle assembly for automotive vehicles, particularly for heavy-duty trucks and the like, wherein the auxiliary traction means may accommodate the power source which rotates the live axle assembly and wherein the motion transmitting action of the auxiliary traction means may be varied by changing the area of contact between the auxiliary traction means and the ground.

A concomitant object of the instant invention is to provide a live axle assembly of the above outlined characteristics wherein the auxiliary traction means may accommodate the differential gearing for the regular traction wheels and which may perform the function of a shock absorber when the vehicle is in motion.

With the above objects in view, the invention resides in the provision of a live axle assembly which comprises spaced traction wheels, preferably hollow drum shaped auxiliary traction means disposed intermediate the traction wheels, means preferably comprising a source of power provided in and drivingly connected with the auxiliary traction means for rotating the same, and means preferably comprising a differential gearing connected for rotation with the auxiliary traction means and drivingly connected with the wheels for rotating the wheels in response to rotation of the auxiliary traction means.

Certain other features of the invention reside in the provision of means for vertically reciprocating the wheels with respect to the auxiliary traction means so as to permit the auxiliary traction means to engage the ground while the wheels are lifted above the ground or vice versa and/or to permit simultaneous engagement of the auxiliary traction means and of the wheels with the ground, in the provision of specially constructed and specially mounted reciprocating means for the wheels, in the special construction and special mounting of the power source for the auxiliary traction means, in the special construction of the frame means in which the live axle assembly is mounted, in the provision of specially constructed axle shafts which form part of the differential gearing and which comprise universal joints for transmitting rotation to vertically reciprocable wheels, and in the provision of specially configurated auxiliary traction means which may be provided with one or more pneumatic or solid-rubber auxiliary wheels as well as with suitable ground engaging grippers or treads so as to adapt the live axle assembly to the conditions of terrain on which a vehicle embodying my live axle assembly is used.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 1:
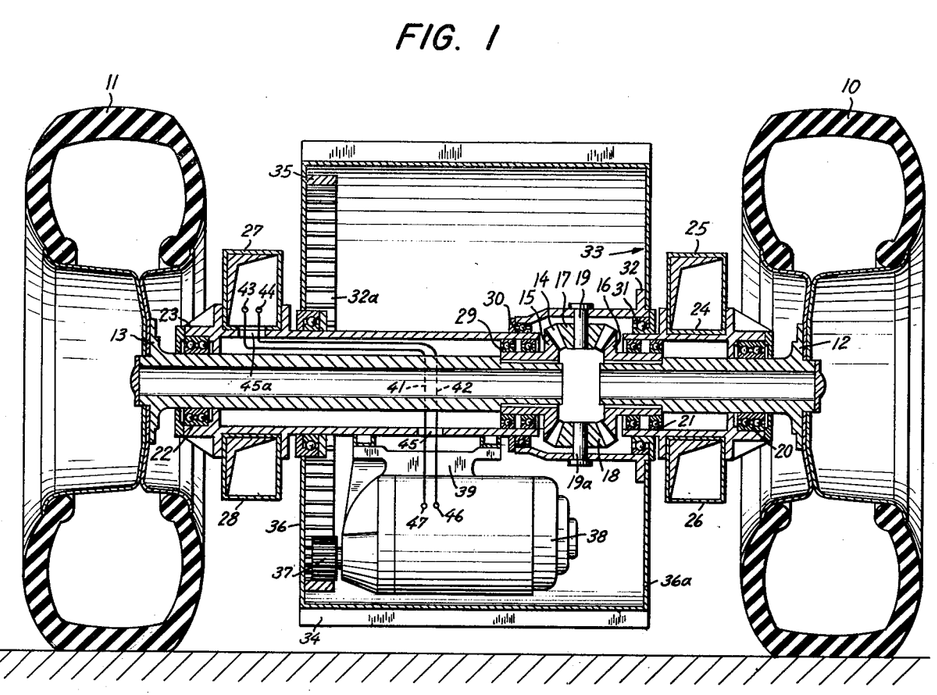
FIG. 1 is an axial section through a live axle assembly embodying one form of my invention.

Referring now in greater detail to the illustrated embodiments, and first to FIG. 1, there is shown a live axle assembly which is assumed to support the rear part of a heavy automotive vehicle, not shown. The assembly comprises two rubber-tired heavy duty traction wheels 10, 11 which are respectively mounted at the outer ends of two coaxial axle shafts 12, 13. The inner end portions of the axle shafts 12, 13 project into the interior of a differential gearing case 14 and are respectively connected with differential side gears 16, 15, the latter meshing with a planet gear system including a pair of differential pinions 17, 18 which rotate on pinion studs 19, 19a secured to and extending into the case 14.

The outer end portions of the axle shafts 12, 13 which carry the hubs of the wheels 10, 11 are rotatable in antifriction bearings 20, 22. The outer races of the bearings 20, 22 are respectively received in supporting means here shown as hollow bearing sleeves 24, 23 which are mounted in and fixed to the frame of the automotive vehicle, this frame including suitably profiled steel frame members 25, 26 for the bearing sleeve 24 and frame members 27, 28 for the bearing sleeve 23. The inner end portion of the axle shaft 12 adjacent to the side gear 16 is received in antifriction bearings 21 which are mounted in the inner end portion of the sleeve 24, and similar antifriction bearings 29 mounted in the inner end portion of the sleeve 23 rotatably support the inner end portion of the axle shaft 13. The inner end portions of the axle shafts 12, 13 are respectively keyed or otherwise non-rotatably secured to the hubs of the side gears 16, 15.

The case 14 of the differential gearing is rotatably mounted on antifriction bearings 30, 31 respectively surrounding the inner end portions of the bearing sleeves 23, 24.

One end of the case 14 is provided with a connecting means in the form of a larger-diameter collar or flange 32 which connects the case with the right-hand end wall 36a of a hollow cylinder or drum 33, the latter constituting the auxiliary traction member of the live axle assembly. The other or left-hand end wall 36 of the traction member 33 is rotatable on antifriction bearings 32a which surround a median portion of the bearing sleeve 23. Though it is possible to utilize a traction member with a smooth periphery, it is usually preferred to provide the periphery of the member 33 with axially parallel or otherwise arranged external ground-engaging grippers or treads 34 which insure that the auxiliary traction member will engage with the ground when the condition and configuration of the terrain, the dimensions of and/or the pressure of the wheels 10, 11, and/or the load carried by the automotive vehicle should render such engagement necessary. The diameter of the traction member 33 including the grippers 34 is preferably somewhat smaller than the maximum diameters of the traction wheels 10, 11 when the latter's tubes (not shown) are in fully inflated condition and when the vehicle travels on hard terrain. Thus, the auxiliary traction member 33 will move into contact with the ground only when the wheels 10, 11 sink into the mud and/or when the tubes of the wheels 10, 11 are at least partly deflated. It will be noted that the member 33 is coaxial with the wheels 10, 11.

The internal space of the member 33 accommodates an internal gear 35 which is coaxially secured to the end wall 36 and whose teeth mesh with a driver pinion in the form of a spur gear 37 which is secured to the output shaft of a power source here shown as an electric motor 38. As shown in FIG. 1, the motor 38 is received in the member 33 and is mounted on a base plate 39 which is secured to the bearing sleeve 23. It will be readily understood that the assembly of FIG. 1 may utilize a different source of power, e.g. an internal combustion engine or a hydraulic motor without any or with minimal changes in the construction of the remaining parts. The electric circuit of the motor 38 includes a pair of conductors 41, 42 which are respectively connected to the motor terminals 47, 46 and extend through a first aperture 45 of the bearing sleeve 23, through the interior of this sleeve, through a second aperture 45a in the sleeve, and are respectively connected to the terminals 43, 44 provided on or in the frame member 27. The source of electrical energy connected with the terminals 43, 44 may consist of a diesel electric generator (not shown) which is mounted on the automotive vehicle. In the event that the electric motor 38 is replaced by a hydraulic motor, the conductors 41, 42 are replaced by suitable pressure conduits for recirculation of a pressure fluid from a pressure source provided on the vehicle to the internal space of the cylinder 33.

The live axle assembly of FIG. 1 operates as follows:

When the circuit of the motor 38 is completed, the pinion 37 drives the internal gear 35 and the latter rotates the auxiliary traction member 33 with the case 14 and with the pinion studs 19, 19a to thereby rotate the pinions 17, 18 and the side gears 15, 16. The side gears 15, 16 respectively drive the axle shafts 13, 12 and the traction wheels 11, 10. The operation of the differential gearing including the side gears 15, 16 and the pinions 17, 18 while the vehicle rounds a corner is self-explanatory. The motor 38 remains stationary because its plate 39 is fixed to the nonrevolving sleeve 23. As soon as the wheels 10, 11 sink into soft ground or if the tubes of these wheels are deflated to a predetermined extent, the grippers 34 engage the ground and assist the wheels in advancing the vehicle. The motor 38 is preferably of the reversible type so that it may drive the wheels 10, 11 and the auxiliary traction member 33 in clockwise or anticlockwise direction.

Figure 2:
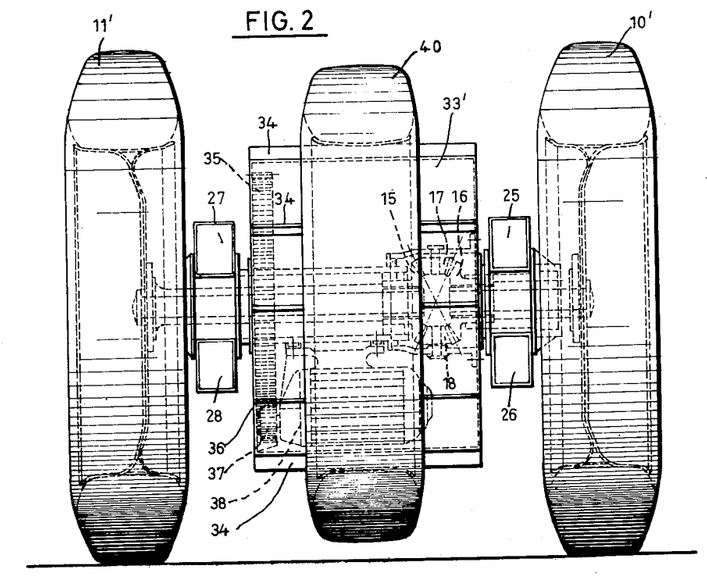
FIG. 2 is a rear end elevational view of a slightly different assembly, further showing a tire mounted on the auxiliary traction member.

FIG. 2 illustrates a live axle assembly which is identical with that shown in FIG. 1 excepting that the diameter of the auxiliary traction member 33', when compared with the diameters of the wheels 10', 11', is smaller and that the member 33' carries an auxiliary wheel comprising a tire 40 whose diameter is at least slightly less than the diameter of the wheels 10', 11'. Preferably, the tube of the tire 40 is only partly inflated. This tire 40 engages the ground as soon as the traction wheels 10', 11' sink into the ground to a predetermined extent or as soon as the pressure in the tubes of the wheels 10', 11' is reduced to a predetermined extent. The conditions under which the tire 40 engages the ground depend on the overall load carried by the vehicle, on the dimensions of and on the pressure prevailing in the tubes of the traction wheels 10', 11', and on the nature of the terrain on which the vehicle travels. It will be readily understood that the auxiliary traction member 33' may be provided with two or more auxiliary wheels and that such auxiliary wheels may comprise combat tires, tubeless tires or solid-rubber tires. The grippers 34 may form part of an endless band which is then secured to the periphery of the member 33'. In the event that the wheels 10', 11', are replaced by smaller-diameter wheels, the tire 40 of the auxiliary wheel may be removed and the assembly of FIG. 2 is then put to use in the same way as described in connection with FIG. 1. The exact configuration of the periphery of the member 33 or 33' and of the auxiliary wheel or wheels will also depend on the nature of the ground and on the weight of the load carried by the vehicle.

In the embodiment of FIGS. 3 to 6, the modified live axle assembly comprises two rubber-tired traction wheels 110, 111. The composite axle shaft for the traction wheel 110 comprises an outer section 112 which is coaxially secured to the hub of the wheel 110, an inner section 112c which is coaxially secured to the hub of the differential side gear 116, and a median section 112b which is respectively connected with the sections 112, 112c by universal joints 150, 151. The other composite axle shaft comprises an outer section 113 which is coaxially keyed or otherwise secured to the hub of the wheel 111, an inner section 113c which is coaxially secured to the hub of the differential side gear 115, and a median section 113b which is respectively connected with the sections 113, 113b by universal joints 152, 153. The joints 150—153 may assume the form of Cardan joints or they may be of any other suitable design. The outer shaft sections 112, 113 are respectively mounted in antifriction bearings 120, 122 provided in hollow outer supporting means here shown as bearing sleeves 112a, 113a.

Figure 3:
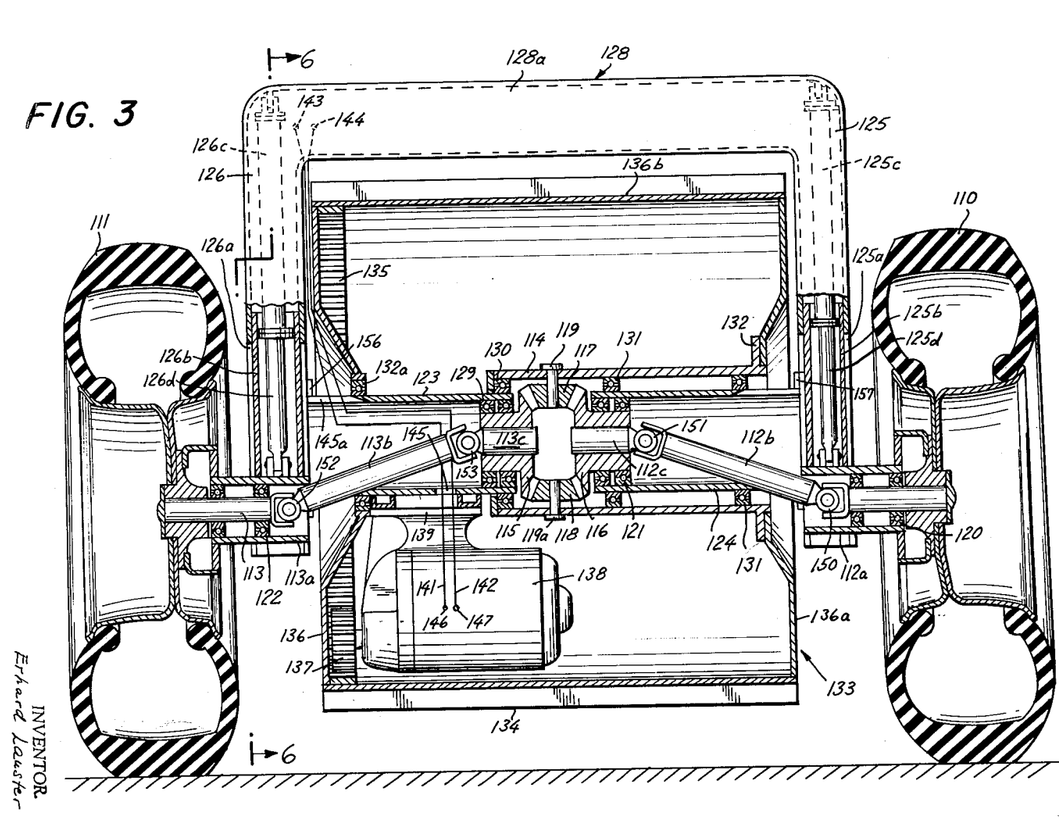
FIG. 3 is an axial section through a modified live axle assembly.

The side gears 115, 116 mesh with differential pinions 117, 118 whose studs 119, 119a are fixed to and extend into the interior of a tubular differential gearing case 114. The case 114 accommodates and is rotatable about two hollow coaxial inner supporting means in the form of bearing sleeve 123, 124 which are resepctively received in the inner races of antifriction, bearings 130, 131, these bearings having outer races engaging with the interior of the case 114. The inner bearing sleeves 123, 124 respectively accommodate the median shaft sections 113b, 112b and receive antifriction bearings 129, 121 for the hubs of the side wheels 115, 116, respectively. The pinions 117, 118 constitute a planet system which revolves with the case 114 and which permits rotation of the side gear 116 with respect to the side gear 115, or vice versa.

The outer bearing sleeves 112a, 113a are vertically slidably carried by the downwardly extending forked arms 125, 126 of an inverted U-shaped frame member or gantry 128 which forms part of the frame of an automotive vehicle, not shown. The arms 125, 126 of the frame member 128 are respectively provided with guideways or slots 125a 126a for the outer bearing sleeves 112a, 113a. To insure that the outer sleeves 112a, 113a are properly guided for vertical movement with respect to the frame member 128, they are respectivly connected with two tubular guide members 125b, 126b which are telescoped into the tubular outer walls of the arms 125, 126, respectively.

Figure 5:
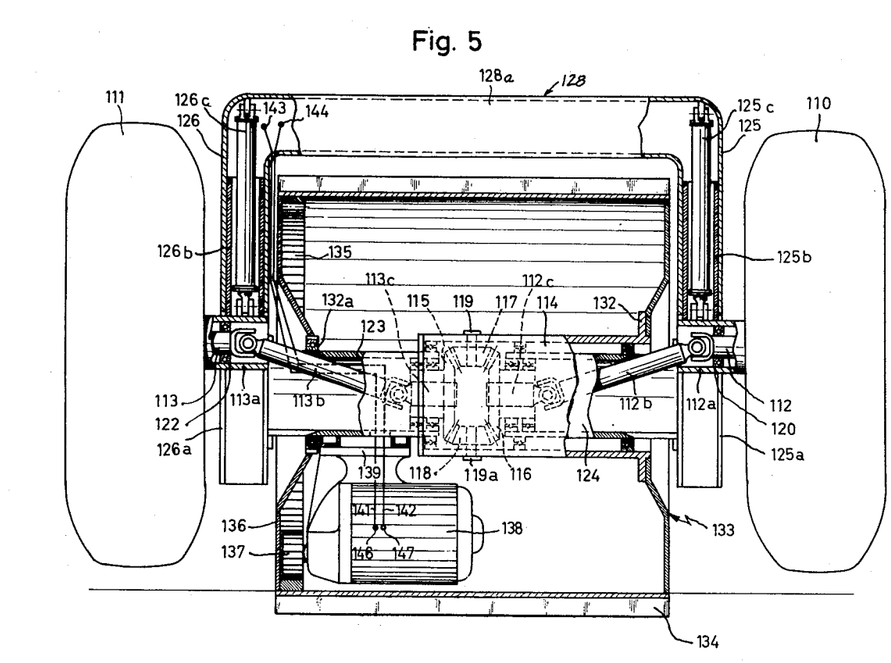
FIG. 5 is a similar view of the modified assembly, showing the traction wheels in lifted position.
Figure 6:
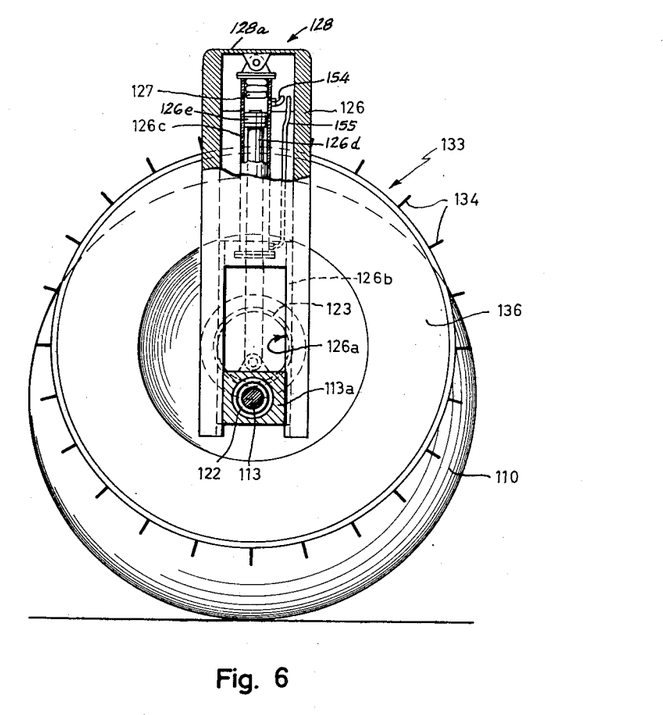
FIG. 6 is a partly elevational and partly sectional view of the modified assembly as seen in the direction of the arrows from the line 6—6 of FIG. 3.

The means for reciprocating the outer bearing sleeve 112a and the traction wheel 110 with respect to the arm 125 comprises a hydraulic motor here shown as a double-acting cylinder and piston assembly including a cylinder 125c whose upper end is preferably articulately connected witht he crossbeam 128a of the frame member 128, and a piston whose piston rod 125d projects downwardly within the tubular guide member 125b and is articulately connected with the sleeve 112a. The reciprocating means for the outer bearing sleeve 113a and for the traction wheel 111 comprises a fluid cylinder 126c whose upper end is articulately fixed to the crossbeam 128a and a piston 126e (see FIG. 6) whose piston rod 126d extends downwardly through the tubular guide member 126b and is articulately connected with the sleeve 113a. The conduits 154, 155 for alternately delivering a pressure fluid to and for permitting the outflow of a pressure fluid from the opposite sides of the piston 126e in the cylinder 126c are shown in FIG. 6. These conduits are connected to a non-illustrated pressure source, e.g. an oil pump, which is mounted on the automotive vehicle. The conduits for the cylinder 125c are of similar design and, therefore, are not shown in the drawings. It will be readily understood that the system including the preferably hydraulic cylinders 125c, 126c includes a reservoir and suitable valves so that the driver may regulate the flow of pressure fluid to cause movements of the wheels 110, 111 between the positions of FIGS. 3 and 5 and into the intermediate position of FIG. 4.

As shown in FIG. 6, the interior of the cylinder 126c above the piston 126e accommodates one or more hollow air-filled pneumatic cushions 127 which take up shocks when the automotive vehicle is in motion so that the reciprocating means 126c—126e actually performs the function of a shock absorber. The other cylinder 125c is provided with similar pneumatic cushions, not shown.

Figure 4:
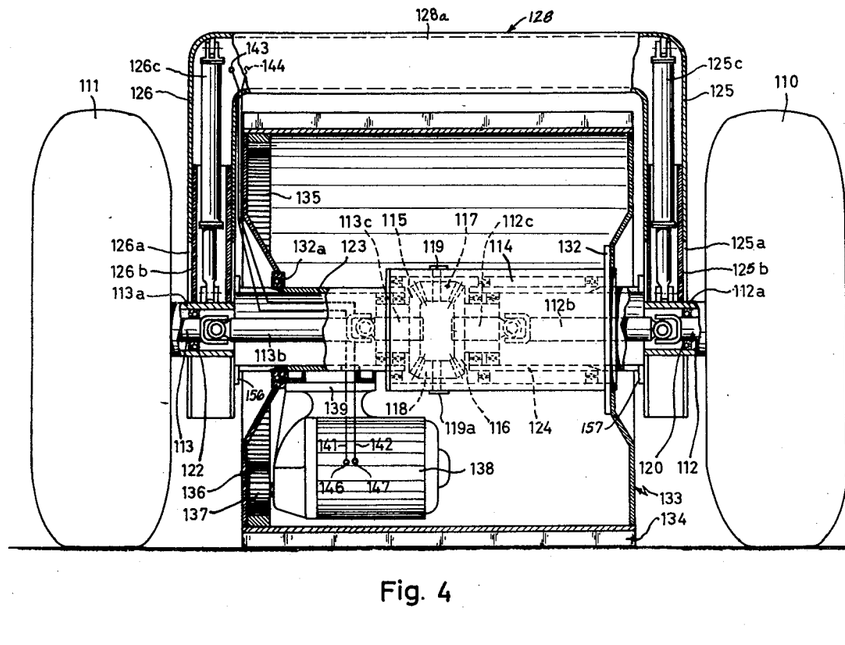
FIG. 4 is a partly elevational and partly axial sectional view of the modified assembly, showing the auxiliary traction member in a different position.

As explained hereinabove, the case 114 is rotatable about the inner bearing sleeves 123, 124 and is mounted on antifriction bearings 130, 131. The right-hand end portion of this case, as viewed in FIGS. 3 to 5, is provided with a connecting means in the form of a collar or flange 132 which is rigidly fixed to the right-hand end wall 136a of an auxiliary traction member in the form of a hollow cylinder or drum 133. The left-hand end wall 136 of the traction member 133 is rotatable on an antifriction bearing 132a which surrounds a median portion of the left-hand inner bearing sleeve 123. The periphery 136b of the traction member 133 is provided with ground-engaging grippers or treads 134 which may be need not be parallel with the axis of the auxiliary traction member.

The internal space of the traction member 133 accommodates an internal gear 135 which is coaxially secured to the end wall 136 or to the periphery 136b of the member 133 and which meshes with a pinion in the form of a spur gear 137 coaxially keyed to the output shaft to a power source in the form of a reversible electric motor 138 whose base plate 139 is secured to the inner bearing sleeve 123. The electric terminals 146, 147 on the motor 138 are respectively connected with conductors 141, 142 which extend through a first aperture 145 of the sleeve 123, through the interior of this sleeve, through a second aperture 145a of this sleeve and to the electric terminals 143, 144 which are provided in or on the frame member 128. As explained in connection with FIG. 1, the motor 138 may be replaced by an internal combustion engine, by a hydraulic motor or by any other suitable power source. The source of electrical energy connected with the terminals 143, 144 may comprise a diesel electric generator, not shown, or the like which is mounted on the automotive vehicle. In the event that the motor 138 is replaced by a hydraulic motor, the conduits for the pressure medium may be led through the apertures 145, 145a and may be connected to that source of pressure fluid which is utilized to operate the cylinder and piston assemblies in the forked arms 125, 126.

The assembly of FIGS. 3 to 6 operates as follows:

In the position of FIG. 3, the pinion 137 of the motor 138 drives the internal gear 135 to rotate the auxiliary traction member 133 which is spaced from the ground and which in turn drives the differential gearing case 114 with the pinions 117, 118 so that the latter may transmit rotary motion to the side gears 115, 116 and hence to both axle shafts to drive the traction wheels 110, 111 in clockwise or anticlockwise direction, depending on the direction in which the motor 138 rotates its pinion 136. In the position of FIG. 3, the outer bearing sleeves 112a, 113a assume their lowermost positions so that the wheels 110, 111 engage with but the auxiliary traction member 133 is lifted above the ground. It will be noted that the inner bearing sleeves 123, 124 are respectively rigidly secured to the arms 126, 125 of the frame member 128, as indicated at 156, 157, respectively. Thus, while the auxiliary traction member 133 is free to rotate, it cannot perform any other movement with respect to the frame member 128. On the other hand, the wheels 110, 111 are free to rotate and are vertically reciprocable in the arms 125, 126 of the frame member.

In the embodiment of FIGS. 3–6, the diameter of the traction member 133 need not be less than the diameters of the wheels 110, 111 because the wheels are vertically movable with respect to the member 133 so that the latter may be lifted above the ground even if the diameters of the wheels 110, 111 are smaller than the diameter of the peripheral wall 136b. However, the diameters of the wheels 110, 111 and the diameter of the member 133 should be selected in such a way that the member 133 is lifted above the ground when the wheels assume the position of FIG. 3. In FIG. 3, the axes of the outer shaft sections 112, 113 are located at a level below the axes of the inner shaft sections 112c, 113c, respectively. It will be readily understood that the universal joints 150—153 permit some movement of the median shaft sections 112b, 113b with respect to the shaft sections 112, 113 and/or 112c, 113c so that the outer sleeves 112a, 113a may perform reciprocatory but need not perform axial movements while being moved between the positions of FIGS. 3 and 5. The live axle assembly assumes the position of FIG. 3 when the vehicle travels on hard ground, e.g. on a good road, and is driven at a high speed.

In the position of FIG. 4, the outer shaft sections 112, 113 are coaxial with the sections 112b, 113b and 112c, 113c, and the grippers 134 are moved into actual engagement with the ground. Such position is reached by lifting the outer sleeves 112a, 113a in their respective guideways 125a, 126a in that the piston rods 125d, 126d are partially withdrawn into their respective cylinders. In such position, the live axle assembly produces maximum traction because the treads of the traction wheels 110, 111 as well as the treads 134 of the auxiliary traction member 133 are moved into contact with the ground. The live axle assembly is moved to the position of FIG. 4 when the ground on which the vehicle travels is of such softness or consistency that the wheels 110, 111 alone could not produce satisfactory traction. For example, on a marshy ground, the contact surface between the vehicle and the ground is increased substantially if the auxiliary traction member is caused to descend into contact with the ground. This prevents a slipping of the live axle assembly with respect to the ground.

In FIG. 5, the sleeves 112a, 113a are moved to their uppermost positions so that the wheels 110, 111 are lifted above the ground, the assembly resting solely on the auxiliary traction member 133. The grippers 134 penetrate into the ground and may advance the vehicle on a muddy terrain on which the wheels would be either useless or would be of little assistance. The position of FIG. 5 is of considerable advantage when the vehicle travels on gravel or another comminuted material whose sharp edges could destroy the tires of the traction wheels 110, 111.

An advantage common to all embodiments of my invention is that the auxiliary traction member 33, 33' or 133 will automatically engage the ground when the pressure in the tubes of the traction wheels 10—11, 10'—11' or 110—111 drops to a predetermined minimum magnitude or when the traction wheels sink into a soft ground. In other words, the operator of the vehicle normally need not pay attention to the auxiliary traction member because he knows that, as soon as the conditions of the terrain on which the vehicle travels render it necessary, the auxiliary traction member will engage the ground and will assist the wheels in advancing the vehicle. Since the diameter of the traction member 33 or 33' is smaller than the diameters of the wheels 10—11 or 10'—11', the assembly of FIGS. 1 and 2 will automatically lift the traction member above the ground as soon as the vehicle reaches a comparatively hard terrain, e.g. a hard-surfaced road or the like. The mounting of the power source 38 or 138 and of the differential gearing in the interior of the auxiliary traction member is of additional advantage because the power source and the gearing are fully protected from atmospheric conditions, from impact of stones and from other influences.

An important advantage of the construction shown in FIGS. 3 to 6 is that the tires of the auxiliary wheels 110, 111 may be protected against unnecessary wear and tear whenever the nature of the terrain is such that the auxiliary traction member 133 by itself can properly advance the vehicle or when unnecessary wear due to slippage of the wheels can be avoided if the area of contact between the ground and the live axle assembly is increased by simultaneous engagement of the wheels and of the auxiliary traction member with the ground. In addition, it has been found that the engagement of the auxiliary traction member with a hard ground is often desirable even if the traction wheels could advance the vehicle without the assistance of the auxiliary member, for example, on roads covered with gravel or the like. In such instances, the auxiliary traction member is put to use solely for the purpose of protecting the expensive tires of the traction wheels against unnecessary wear. The valves and pressure indicating manometer or manometers of the fluid-operated reciprocating means for the wheels 110, 111 are preferably installed on the dashboard or in another part of the driver's cab so that the driver may distribute the load between the wheels and the auxiliary traction member.

Without further analysis, the foregoing will so fully reveal the gist of the present invention that others can, by applying current knowledge, readily adapt it for various applications without omitting features that, from the standpoint of prior art, fairly constitute essential characteristics of hte generic and specific aspects of this invention and, therefore, such adaptations should and are intended to be comprehended within the meaning and range of equivalence of the following claims.

What is claimed as new and desired to be protected by Letters Patent is:

1. A live axle assembly for automotive vehicles comprising, in combination, spaced traction wheels; frame means with respect to which said wheels are freely turnable; differential means drivingly connected with said wheels; hollow auxiliary traction means located intermediate said wheels, said frame means having a portion extending into said traction means and with respect to which said traction means is freely turnable; and a source of power carried by said portion of said frame means in said traction means for rotating said traction means and said differential means, said source and said differential means provided in the interior of said traction means.

2. A live axle assembly for automotive vehicles comprising, in combination, spaced traction wheels; frame means with respect to which said wheels are freely turnable; hollow auxiliary traction means disposed intermediate said traction wheels, said frame means having a portion extending into said traction means and with respect to which said traction means is freely turnable; a source of power for rotating said auxiliary traction means, said source of power being carried by said portion of said frame means in said traction means and operatively connected to the latter for rotating the same relative to said frame means; and differential means fixed in part to said traction means in the interior thereof and operatively connected to said wheels for drivingly connecting said auxiliary traction means with said traction wheels.

3. A live axle assembly for automotive vehicles comprising, in combination, spaced traction wheels; frame means with respect to which said wheels are freely turnable; hollow auxiliary traction means disposed intermediate said traction wheels, said frame means having a portion extending into said traction means and with respect to which said traction means is freely turnable, said auxiliary traction means comprising coaxial auxiliary wheel means; a source of power for rotating said auxiliary traction means, said source of power being carried by said portion of said frame means in said traction means; and means comprising differential means for drivingly connecting said auxiliary traction means with said traction wheels, said differential means being fixed in part to said traction means to transmit a drive from the rotating traction means to said wheels.

4. An assembly as set forth in claim 3, wherein said auxiliary wheel means comprises at least one pneumatic tire.

5. An assembly as set forth in claim 3, wherein said auxiliary wheel means comprises at least one solid-rubber tire.

6. In an automotive vehicle, in combination, frame means; and a live axle assembly comprising first and second inner supporting means fixed to said frame means, first and second outer supporting means respectively adjacent to said first and second inner supporting means, means connected with said frame means and with said outer supporting means for vertically reciprocating said outer supporting means with respect to said inner supporting means and with respect to said frame means, spaced first and second traction wheel means each rotatably mounted in and each reciprocable with one of said outer supporting means, hollow auxiliary traction means located intermediate said wheel means and rotatable about said inner supporting means, a source of power for rotating said auxiliary traction means, and differential gearing means operatively connected with and rotatable by said auxiliary traction means and drivingly connected with said wheel means for rotating the wheel means in response to rotation of said auxiliary traction means, said wheel means reciprocable with respect to said frame means and with respect to said auxiliary traction means between a first position of engagement with and a second position above the ground whereby said auxiliary traction means engages with the ground at least when the wheel means are in said second position, said differential gearing means and said source of power located in said auxiliary traction means.

7. A combination as set forth in claim 6, wherein said frame means comprises a pair of spaced downwardly extending arms and the means for reciprocating said outer supporting means comprises a fluid motor mounted in each of said arms.

8. A combination as set forth in claim 7, wherein said frame means further comprises a substantially horizontal crossbeam and each fluid motor comprises a double-acting cylinder connected with said crossbeam and a piston rod connected with the respective outer supporting means.

9. A combination as set forth in claim 7, wherein each of said reciprocating means comprises a tubular guide member telescoped into the respective arm and connected with the respective outer supporting means.

10. A combination as set forth in claim 7, wherein each of said arms is provided with guideways reciprocably receiving the respective outer supporting means.

11. A combination as set forth in claim 7, wherein each fluid motor comprises at least one cushioning means for absorbing the shocks when the vehicle is in motion.

12. A combination as set forth in claim 7, wherein the diameter of said traction means at least approximates the diameters of said wheel means.

13. In an automotive vehicle, in combination, a frame means; and a live axle assembly comprising aligned first and second inner supporting means fixed to siad frame means, first and second outer supporting means respectively adjacent to said first and second inner supporting means, means connected with said frame means and with said outer supporting means for vertically reciprocating said outer supporting means with respect to said inner supporting means and with respect to said frame means, spaced first and second traction wheel means each rotatably mounted in and each reciprocable with one of said outer supporting means, hollow auxiliary traction means located intermediate said wheel means and rotatable about said inner supporting means, a source of power for rotating said auxiliary traction means, and means comprising a differential gearing including a case, means drivingly connecting said auxiliary traction means with said case, and composite axle shafts extending through said inner and outer supporting means and drivingly connected with said wheel means for rotating the wheel means in response to rotation of said auxiliary traction means, each axle shaft comprising a plurality of sections and universal joint means for connecting said sections, said wheel means reciprocable with respect to said frame means and with respect to said auxiliary traction means between a first position of engagement with and a second position above the ground whereby said auxiliary traction means engages with the ground at least when the wheel means are in said second position, said source of power and said differential gearing located in said auxiliary traction means.

14. A combination as set forth in claim 13, wherein said means for rotating the auxiliary traction means is a motor connected with one of said inner supporting means, said case coaxial with said auxilary traction means.

15. A live axle assembly for automotive vehicles, comprising spaced first and second traction wheel means; frame means with respect to which said first and second traction wheel means are freely turnable; differential means drivingly connected with said first and second wheel means; hollow auxiliary traction means disposed intermediate said first and second wheel means and enclosing said differential means, said differential means being fixed in part to said traction means and said frame means including a portion extending into said auxiliary traction means and with respect to which the latter is freely turnable; a source of power for rotating said auxiliary traction means and for driving said differential means, said source of power located in the interior of said auxiliary traction means and being carried by said portion of said frame means; and means for reciprocating said first and second wheel means into contact with and above the ground so that the auxiliary traction means engages with the ground at least at such times when said first and second wheel means are out of contact with the ground.

References Cited in the file of this patent

UNITED STATES PATENTS

| 1,520,912 | Scrabic | Dec. 30, 1924 |
| 1,690,970 | Ehlert | Nov. 6, 1928 |
| 1,712,155 | Mistral | May 7, 1929 |
| 1,731,814 | Caldwell et al. | Oct. 15, 1929 |
| 2,120,745 | Greiner et al. | June 14, 1938 |
| 2,164,845 | Steed et al. | July 4, 1939 |
| 2,878,731 | Kressin | Mar. 24, 1959 |

FOREIGN PATENTS

| 42,812 | Switzerland | Jan. 27, 1908 |
| 388,197 | France | May 25, 1908 |
| 721,120 | France | Dec. 12, 1931 |
| 1,055,432 | France | Oct. 14, 1953 |

(Corresponding U.S. 2,617,489, Nov. 11, 1952)

| 652,958 | Great Britain | May 2, 1951 |

OTHER REFERENCES

Lauster German application, 1,116,543, printed Nov. 2, 1961 (K163c7).